UNITED STATES PATENT OFFICE.

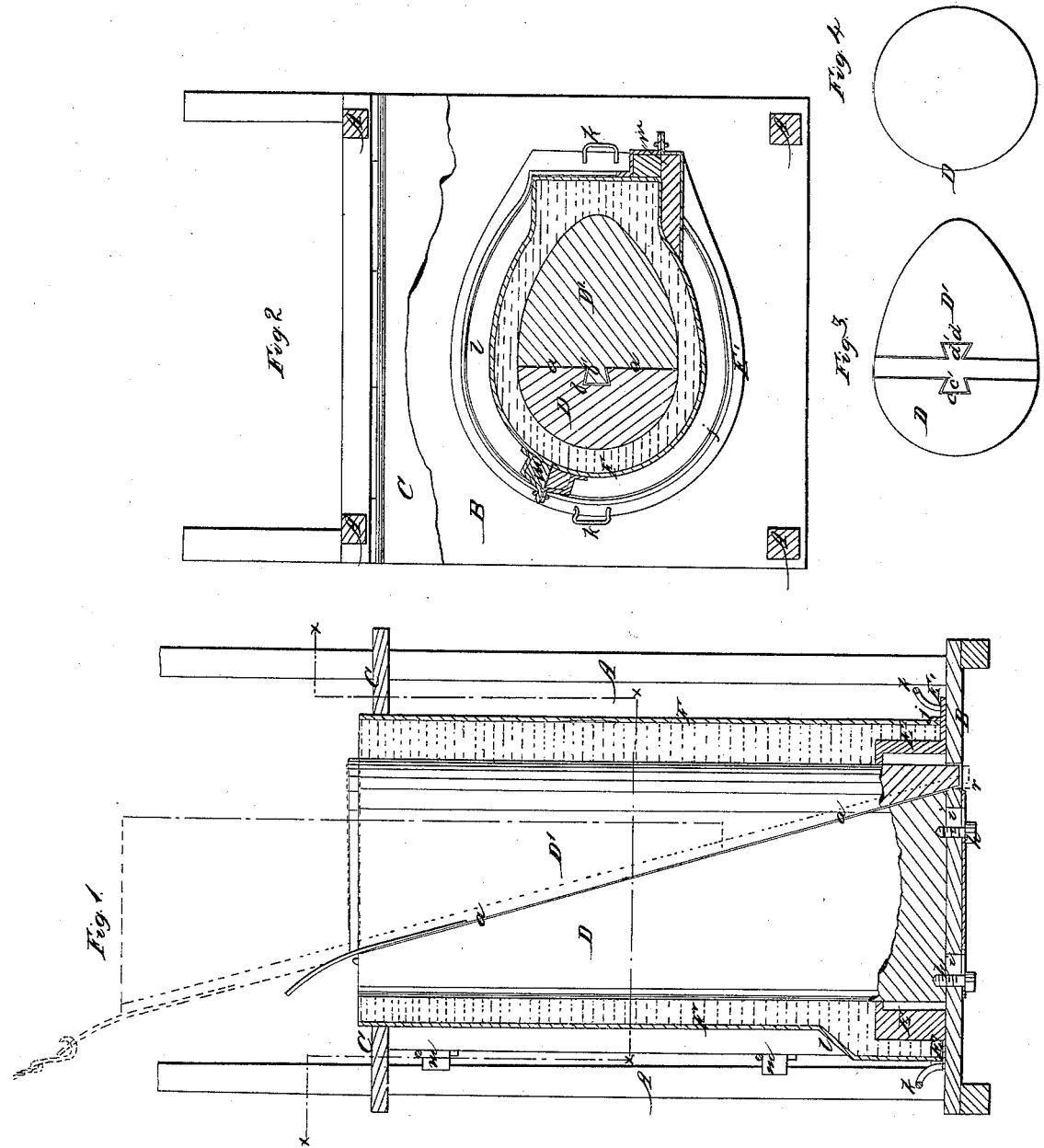

HENRY KNIGHT, OF JERSEY CITY, NEW JERSEY.

IMPROVEMENT IN MOLDS FOR CEMENT PIPES.

Specification forming part of Letters Patent No. 35,243, dated May 13, 1862.

*To all whom it may concern:*

Be it known that I, HENRY KNIGHT, of Jersey City, in the county of Hudson and State of New Jersey, have invented a new and useful Improvement in Molds for Manufacturing Hydraulic-Cement Pipes; and I do hereby declare that the following is a full, clear, and exact description of the same, reference being had to the accompanying drawings, forming part of this specification, in which—

Figure 1 is a vertical central section of my improvement. Fig. 2 is a horizontal section of the same in the line $x\ x$. Fig. 3 is a horizontal section of a modified form of core-bar. Fig. 4 is also a horizontal section of a core-bar.

The same letters of reference in the several figures indicate corresponding parts.

The nature of my invention consists in the use of a sectional mold or a mold capable of being opened and closed, with its lower end enlarged and shouldered, as hereinafter described, in combination with a central core, which has a right-angled continuous enlargement or shoulder at its base, whereby hydraulic-cement pipe, with an external projecting collar and an internal right-angled socket at one end, may be molded vertically without the necessity of slipping the core down through the bed-plate, in order to remove the mold and pipe from the machine, and whereby also the necessity of finishing the upper end of the cement pipe at the upper end of the core-bar by means of an annular detachable collar, as in a former patent of my own, is obviated.

To enable others skilled in the art to make and use my invention, I will proceed to describe its construction and operation.

A is a framing with a platform, B, and a hinged adjustable centering-table, C, substantially the same as shown in former patents granted to me on machines of like character.

D D' is an egg-shaped central core-bar, cast solid, but in two parts, said parts uniting together diagonally, as at $a\ a$, and a dovetail tongue and groove maintaining the union, as shown at $b\ b'$. It may, however, be cast in three parts and united in a diagonal manner by means of two dovetail tongues and grooves, $c\ c'\ d\ d'$, as shown in Fig. 3; or it may be in one cylindrical piece, as shown in Fig. 4, as experiments practiced privately by me, one or more years past, with molds having an enlarged base have demonstrated that by the use of a one-part core with a base shoulder or collar in connection with such molds hydraulic-cement pipe with external collars and right-angled sockets can be produced. However, to facilitate the description I will refer to the core-bar as made in two parts, in connection with the mold, &c., as shown in Figs. 1 and 2.

The part D of the core-bar is attached to the platform B by means of set-screws $h\ h$, said screws passing up loosely through oblong slots $i\ i$ and taking firmly into the bottom of the said part of the core-bar. The part D', when matched properly with the part D of the core, has its smallest or lower end extend down through a taper aperture, $r$, formed through the platform B, said aperature, in connection with the wedge shape of the said end of the part D' of the core-bar, controlling the extent of vertical movement of the part D', the slots $i\ i$ at the same time allowing the part D of the core-bar a lateral movement toward or from the part D', accordingly as the part D' is moved.

Around the base of the core is arranged a circular collar, E, which forms a right-angled shoulder. From the base of this collar a horizontal circular flange, E', extends sufficiently far to serve as a base or bottom to the mold, and from the top of this flange rises a circular raised bead, $j$, and two lifting loops or handles, $k\ k$, as shown. The collar in this instance is fitted loosely round the core-bar; but if the core-bar is made in one piece the collar may be made fast on the core-bar, and the flange E' made separate from the collar and to slip loosely upon it.

F is a vertical two-part flask or mold made with its lower end enlarged in diameter all round, except at the portion which gives a flat base to the cement pipe, the lower enlarged portion and the upper reduced portion being united by means of a nearly horizontal circular flange, $l$, on the upper portion, as shown. The mold thus constructed presents at its lower end a continuous nearly right angle below the base of its upper reduced portion. This mold or flask is placed round the core-bar, and its two parts are united at opposite points by means of clamps $m$ $m$. When the mold is thus arranged, its enlarged lower end fits down within the ring-bead $j$, and is held in a true position by said bead and the hinged centering-table G, the latter being thrown down to a horizontal position on its hinges around the upper end of the mold, as shown.

With the parts thus adjusted, the hydraulic cement is gradually introduced and rammed into the mold from the top, until the cement rises to or above the top of the core-bar. The surplus cement being struck off of the top of the mold by a trowel or other tool, the part D' of the core-bar is struck a slight blow, so as to compress the cement in all directions within the mold, the blow thus applied causing the part D' to descend very slightly and the part D to move outward laterally, the slots $i$ $i$ allowing it a chance to thus move. The molded cement pipe thus produced is allowed to "set" in the mold. When set, the part D' of the core-bar is lifted out of its position, as illustrated in full red lines in Fig. 1, and removed out of the way. In the act of lifting the part D' the part D is drawn inward laterally from the pipe to the extent of the length of the slots $i$ $i$. The core now being partially freed from the pipe, the mold, base, collar, and cement pipe are lifted together over the part D of the core-bar by means of its handles or lifting-loops, a crane or other device being provided on the framing for aiding in the lifting operation.

I do not confine myself to a flask of elliptical or an elongated form in its horizontal section, as my invention may just as readily be embodied in a flask and core which are circular at all points in their horizontal section, no change other than to make the parts circular instead of elliptical in form being necessary; for do I confine myself to a divided core, as a core with an enlargement which presents a corner all round, made in one piece, will, in connection with the flask enlarged at its lower end, perform my invention.

What I claim as my invention, and desire to secure by Letters Patent, is—

1. The combination of the divided core D D', slots $i$ $i$, guide-pins $h$ $h$, and perforated platform B, substantially in the manner described.

2. The construction of the base-plate E E' in such a manner that it constitutes when in use the collar of the core-bar and also the bottom of the mold, and serves as a support to the outer or lower end of the pipe and also to the shoulder of the socket when the mold and pipe are being lifted over the core, substantially as described.

3. The construction of a vertical mold, divided longitudinally into two parts, in combination with the base-plate so arranged that it shall support and hold the two parts of the mold firmly closed while the said mold and the inclosed pipe are being raised over the core-bar, substantially as described.

HENRY KNIGHT.

Witnesses:
JAMES LEAHY,
JAMES CRAWFORD.